Dec. 1, 1936.  W. S. ROOT, JR  2,062,937
THERMOSTATIC VALVE DEVICE
Original Filed June 20, 1934

INVENTOR.
Walter Sabin Root, Jr.
BY
ATTORNEY.

Patented Dec. 1, 1936

2,062,937

UNITED STATES PATENT OFFICE 2,062,937

THERMOSTATIC VALVE DEVICE

Walter Sabin Root, Jr., Cleveland, Ohio, assignor to The Bishop & Babcock Mfg. Company, Cleveland, Ohio, a corporation of Ohio Application June 20, 1934, Serial No. 731,488
Renewed May 5, 1936

6 Claims. (Cl. 236—34)

This invention relates to thermostatic valve devices and particularly to thermostatic valve devices for controlling the rate of flow of fluid in a fluid conduit system in accordance with temperature of the fluid.

It is an object of the invention to provide generally an improved thermostatic valve device.

Another object is to provide a valve device of the class comprising a movable valve element having improved thermally responsive means for controllingly moving the valve element.

Another object is to provide, in a thermostatically operated valve device, improved means for adjustably varying the response thereof to changes of temperature.

Another object is to provide, in a thermostatic valve device comprising a thermostatic element, improved means for applying thermally effected movements of the element to valve controlling purposes.

Another object is to provide, in a valve device comprising a thermostatic element, improved mechanism for magnifying thermally effected movements of the thermostatic element for valve operating purposes.

Other objects will be apparent to those skilled in the art to which my invention appertains.

My invention is fully disclosed in the following description taken in connection with the accompanying drawing, in which.

Figure 1:
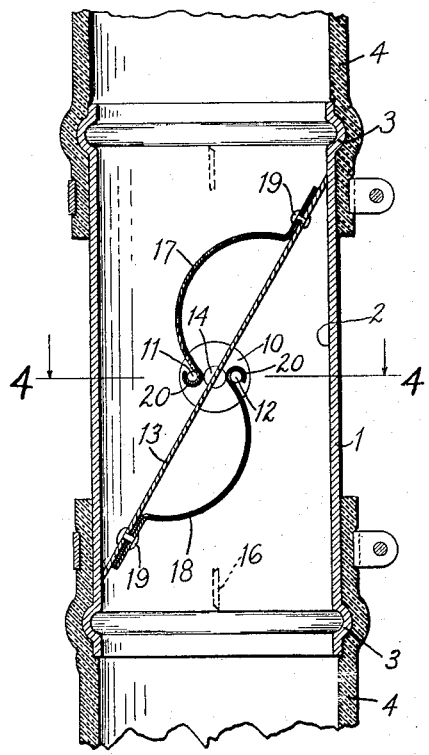
Fig. 1 is a longitudinal sectional view of an embodiment of my invention.
Figure 2:
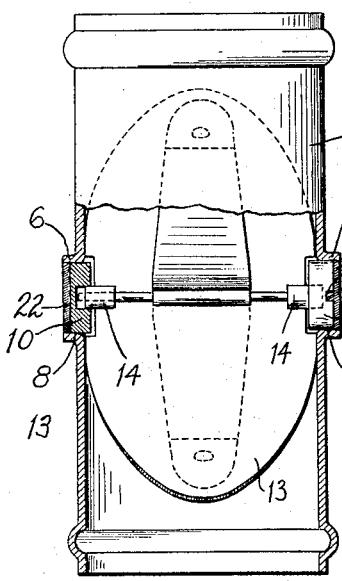
Fig. 2 is a side elevational view taken in general from the left-hand side of the embodiment of Fig. 1 and with parts broken away for clearness.
Figure 3:
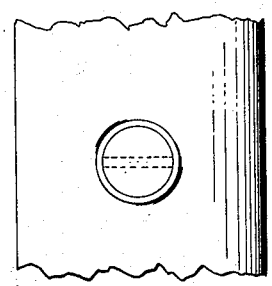
Fig. 3 is a fragmentary elevational view taken from the right-hand side of the embodiment of Fig. 2.

As will appear hereinafter, my invention is applicable to the control of the rate of flow of fluids, gaseous or liquid, in any kind of a conduit system. In Figs. 1 to 3 I have illustrated an embodiment of my invention in a form convenient to be installed in a flexible conduit line such for example as a hose line. At 1 is shown a main frame or body generally of tubular form providing a tubular passageway 2 therethrough, opposite ends of the tube 1 being formed with outwardly projecting beads 3—3 whereby end portions 4—4 of an interrupted hose line may be forcibly telescoped over the opposite ends of the tube 1 and sealed thereon by the beads 3—3.

The wall of the tube in a longitudinally intermediate portion thereof is provided with opposite preferably diametrically aligned outwardly projecting press-formed annular flanges or tubular portions 5 and 6, thus providing a pair of aligned generally cylindrical bores 7 and 8. Heads 9 and 10 having cylindrical portions substantially fitting the bores 7 and 8 are rotatably supported in the bores 7 and 8. The heads 9 and 10 are connected by a pair of pivot pins 11 and 12 extending transversely across the passageway 2 and seated at their opposite ends in bored recesses in the heads 9 and 10, and preferably rigidly connected thereto as by soldering although this connection may be made otherwise to permit the two heads 9 and 10 and the pivot pins 11 and 12 to rotate in unison on a common axis in a manner and for a purpose to be described.

A valve element 13, preferably formed from flat sheet metal, has trunnion elements 14—14 secured to opposite portions thereof. The trunnion elements 14 are preferably made from short lengths of round bar metal stock slitted for a portion of their length, and opposite edge portions of the valve element 13 being inserted into the slits with portions of the trunnion elements projecting oppositely therefrom in axially aligned relation. The heads 9 and 10 are provided in generally central portions thereof with recesses 15—15 formed to rotatably receive the ends of the trunnion elements 14—14 to oscillatably support the valve element 13.

Figure 4:
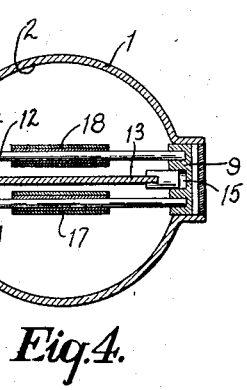
Fig. 4 is a cross-sectional view taken from the plane 4—4 of Fig. 1.

The parts just described are preferably so arranged that the axis of rotation of the trunnion elements 14—14 is parallel to and disposed diametrically between the pivot pins 11 and 12 as shown in Figs. 1 and 4.

The valve element 13 is formed so that it may be disposed to close the passageway 2 when in an inclined position therein and therefore the periphery thereof is given the form of an ellipse when the passageway 2 is cylindrical and correspondingly formed for other forms of passageway. As will now be apparent, when the valve element 13 is moved from the passageway closing position of Fig. 1 and oscillated around the axis of the trunnion elements 14—14, it will obstruct the passageway 2 less and less, permitting flow therethrough, and will provide for the maximum flow rate when the valve element has been moved to the dotted line position 16, Fig. 1.

A pair of elongated bimetallic thermostatic elements 17 and 18 are provided, each connected at an end portion to the valve element 13 preferably by riveting as shown at 19—19, and preferably at points relatively remote from the rotational axis of the trunnion elements 14—14. The opposite or inner ends of the thermostatic elements 17 and 18 are bent with eyes 20—20 telescoped on the pivot pins 11 and 12 to oscillate thereon.

The intermediate portions of the thermostatic elements 17 and 18 are preferably bent or bowed and while the outer ends are connected to the valve element 13 at points remote from the oscillation axis of the valve element, the inner ends are disposed closely adjacent to the axis of the valve element by disposing the pins 11 and 12 closely thereto.

A suitable position for the trunnion elements 14 is with their rotational axis on a diameter of the tubular passageway 2, and a suitable location for the pins 11 and 12 is on transversely opposite sides thereof. The bimetallic elements 17 and 18 may thus be bowed or bent concavely toward the valve element 13 and on opposite sides respectively thereof.

In the embodiment illustrated it is contemplated that the valve element 13 will be in the solid line passageway closing position at a relatively low temperature and will move to variously open the passageway at higher temperatures. To this end, the bimetal of the thermostatic elements 17 and 18 is disposed so that the material having the greater coefficient of expansion is on the outer or convex side of the elements. Thus, upon a rise of temperature of fluid in the casing 2, the elements 17 and 18 will warp to become more acutely bent; and thereby, reacting upon the valve element 13 and the pins 11 and 12 at the points of connection therewith, will exert a rotary torque on the valve element, rocking or oscillating it to various open positions depending upon the degree of rise of temperature. And, conversely, upon a fall of temperature, the valve element will be moved toward or to the closed position.

The temperature at which the valve element 13 will take up the closed position illustrated may be predetermined by adjusting the device as follows. The head 9 is provided with a screwdriver slot 21 outwardly thereof, and as stated above, the heads 9 and 10 are rotatably fitted in the bores 7 and 8. When the parts are first put together, a screwdriver in the slot 21 may rotate the head 9 and thereby, acting through the pivot pins 11 and 12, may rotate the head 10 so that the pivot pins 11 and 12 are rotated but maintained in their parallel relation and suitably spaced from the axis of the valve element. Rotation of the pins will rotate the valve element therewith acting through the thermostatic elements 17 and 18, and thus the valve element may be moved to any position such as a closed position at a predetermined temperature. When the adjustment has thus been made, the bore 8 around the head 10 and outwardly thereof as at 22 may be filled with solder to rigidly and permanently secure the head 10 to the tube wall; then the screwdriver may be removed from the slot 21 and the head 9 likewise rigidly secured to the tube wall by solder as at 23, and the solder may cover and conceal the screwdriver slot 21 to avoid unauthorized tampering therewith.

If it be desired that a considerable rise of temperature must occur before the valve will move from the closed position, the above described adjustment may be made, rotating the heads 9 and 10 sufficiently to put the thermostatic elements 17 and 18 under tension holding the valve element 13 in the closed position under pressure; and thus before the valve element will move from the closed position, the temperature must rise sufficiently to offset the tension of the thermostatic elements.

While in the above description the valve element 13 and thermostatic elements 17 and 18 are constructed and disposed to increase the flow rate to the passageway 2 upon a rise of temperature, it will now be apparent that the device may be constructed to effect the converse result, that is, to reduce the flow on a rise of temperature. In such cases, the heads 9 and 10 will be adjusted to dispose the valve element 13 in the full open position 16 at a relatively low temperature, and the thermostatic elements 17 and 18 would be disposed with the material of greater coefficient of expansion on the concave side thereof. With this arrangement, upon a rise of temperature, the valve element would be moved from the position 16 toward or to the closed position.

Figure 5:
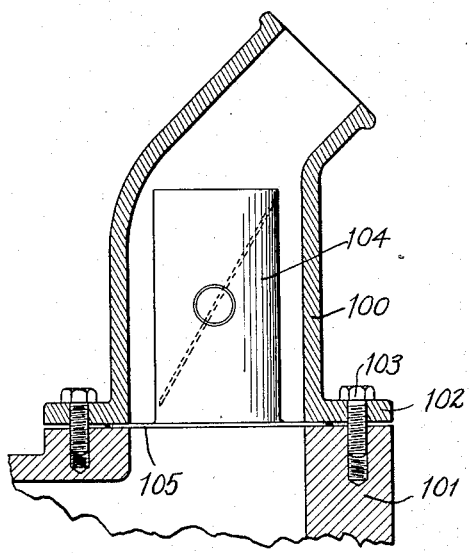
Fig. 5 is a view illustrating another embodiment of my invention.

In the modification of Fig. 5, I have shown an embodiment which it is contemplated to employ in a complete conduit system by immersing the device in the fluid of the system. Such a system may comprise a conduit portion or portions one of which is indicated at 100, and a reservoir, box, receiving or accumulating head or the like 101, the conduit portion 100 being secured to the portion 101 by any suitable means such as a flange 102 on the conduit portion 100 through which bolts 103 may be projected and screwed into the conduit portion 101. The thermostatic valve device may comprise a main frame 104 which may be tubular or provided with a passageway therethrough and the lower end of the frame may be provided with a flange 105 which may be disposed between the flange and the portion 101 to sealingly support the frame. The outer end of the portion 100 may be formed to be suitably joined to continuing portions of the conduit system.

My invention is not limited to the exact details of construction shown and described and may be embodied in structures differing from the illustrated and described embodiment without departing from the spirit of my invention and without sacrificing its advantages and within the scope of the appended claims.

I claim:

1. In a thermostatically operated valve construction, a frame having a flow passage therethrough, a valve oscillatably pivoted on the frame to control flow through the passage, a bimetal strip bent concavely open between opposite end portions thereof, connected at one end portion to the valve at a point remote from the pivot axis and at the other end portion pivotally connected to the frame at a point adjacent to but spaced from the pivot axis.

2. In a thermostatically operated valve construction, a frame having a flow passage therethrough, a valve oscillatably pivoted on the frame to control flow through the passage, a bimetal strip bent concavely open between opposite end portions thereof, connected at one end portion to the valve at a point remote from the pivot axis and at the other end portion pivotally connected to the frame at a point adjacent to but spaced from the pivot axis, and means for adjustably rotating the pivot connection around the valve pivot axis to adjust the position of the valve for a given temperature of fluid in the passage.

3. In a thermostatically operated valve construction, a frame having a flow passage therethrough, a valve oscillatably pivoted on the frame to control flow through the passage, a thermostat connected at one portion to the valve at a point remote from the pivot axis and at a portion spaced from the said portion pivotally connected to the frame at a point adjacent to but spaced from the pivot axis of the valve.

4. In a thermostatically operated valve construction, a frame having a flow passage therethrough, a valve oscillatably pivoted on the frame to control flow through the passage, a bimetal strip bent concavely open between opposite end portions thereof, connected at one end portion to the valve at a point remote from the pivot axis and at the other end portion connected to the frame at a point adjacent to but spaced from the pivot axis.

5. In a thermostatically operated valve construction, a frame providing a tubular passage therethrough, a pair of spaced bearing elements in opposite walls of the passage, a valve in the passage to control flow therethrough pivotally supported on the bearing elements, a thermostatic element connected at one portion to the valve at a point remote from the pivot axis and at a portion spaced from the first named portion pivotally connected to a pin element supported at opposite ends in the bearing elements, the bearing elements being simultaneously rotatable on the frame to adjust the position of the valve for a given temperature of fluid in the passage.

6. In a thermostatically operated valve construction, a frame providing a tubular passage therethrough, a pair of spaced bearing elements in opposite walls of the passage, a valve in the passage to control flow therethrough pivotally supported on the bearing elements, a bimetal thermostatic element connected at one portion to the valve at a point remote from the pivot axis and at a portion spaced from the first named portion pivotally connected to a pin element supported at opposite ends in the bearing elements, the bearing elements being simultaneously rotatable on the frame to adjust the position of the valve for a given temperature of fluid in the passage.

WALTER SABIN ROOT, Jr.